Patented July 25, 1933

1,919,726

UNITED STATES PATENT OFFICE

PAUL C. JONES, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.  Application filed August 22, 1928.  Serial No. 301,429.

This invention relates to the art of preserving rubber, either in the vulcanized or unvulcanized condition, and to rubber compositions so preserved.

It is well known that many substances, known generically as anti-oxidants or age-resisters, possess the property, when incorporated into rubber, of retarding the deterioration which it normally undergoes when exposed to light, heat or air. The object of this invention is to provide a new and useful class of age-resisters and to provide age-resisting rubber compositions.

This invention, in brief, consists in treating rubber with an amino-azo-aromatic hydrocarbon, such as p-amino-azo-benzene or amino-azo-naphthalene. Such compounds have been found to possess to a marked degree the property of retarding the deterioration of rubber compositions into which they have been incorporated. They are employed preferably in the proportion of from 0.2 to 5.0 parts by weight of the age-resister to 100 parts of rubber.

As specific examples of the method of this invention rubber compositions were prepared containing blended plantation rubbers 100 parts by weight, sulfur 5.5 parts, zinc oxide 30 parts, gas black 40 parts, mineral rubber 10 parts, palm oil 5 parts, and hexamethylene tetramine 0.75 part. One such composition without age-resister was used as a control. Two others contained as age-resister, in addition to the other ingredients, 0.95 part (0.5% of the composition) respectively of amino-azo-benzene and amino-azo-naphthalene. The compositions were thoroughly mixed, and cured in a press for 45 minutes at 294°. The vulcanized compositions were tested to compare their relative rates of aging by measuring their tensile strength and elongation at the breaking point before and after aging. Accelerated aging was carried out in the Geer aging oven, in which the samples were maintained at a temperature of 158° F. in a constantly renewed stream of air, as well as in the Bierer-Davis bomb in which they were maintained at the same temperature in an atmosphere of oxygen at a pressure of 300 lbs. per sq. in. The results are shown in the following table:

Tensile strength in lbs. per sq. in. and elongation at the breaking point

| Age-resister 0.5% | Before aging | | After 7 days in the Geer oven | | After 48 hours in the Bierer-Davis bomb | |
|---|---|---|---|---|---|---|
| | Tensile strength | Elongation | Tensile strength | Elongation | Tensile strength | Elongation |
| None (control) | 3539 | 657% | 2072 | 503% | 688 | 317% |
| Amino-azo-benzene | 3638 | 653% | 2363 | 543% | 1067 | 418% |
| Amino-azo-naphthalene | 3792 | 707% | 2445 | 567% | 1548 | 510% |

From the above results it is evident that the amino-azo aromatic hydrocarbons are very effective in retarding the deterioration of rubber. Mixed amino-azo-compounds, such as that of benzene and naphthalene, and substituted compounds, such as the dimethylamino-azo-benzene have also been tested and found to be effective age-resisters. In general, substitution products, especially those in which a hydrocarbon or hydroxyl radical is substituted on the aromatic nucleus, will also be found effective. Compounds of this class may also be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the age-resisters into the rubber by milling or similar process, or to the application thereof to the surface of a mass of crude or vulcanized rubber. The term "rubber" is likewise employed in the claims in a generic sense to include caoutchouc, balata, gutta percha, rubber isomers and like products, whether or not admixed with fillers, pigments, vulcanizing or accelerating agents.

I claim:

1. The method of preserving rubber which comprises treating rubber with amino-azoaromatic hydrocarbons containing at least one condensed ring nucleus.

2. The method of preserving rubber which comprises treating rubber with p-amino-azo-aromatic hydrocarbons containing at least one naphthalene nucleus.

3. The method of preserving rubber which comprises treating rubber with p-amino-azo-naphthalene.

4. A composition of matter comprising rubber and amino-azo-aromatic hydrocarbons containing at least one condensed ring nucleus.

5. A composition of matter comprising rubber and p-amino-azo-aromatic hydrocarbons containing at least one naphthalene nucleus.

6. A composition of matter comprising rubber and p-amino-azo-napthalene.

7. A rubber product resulting from the vulcanization of a rubber composition comprising a vulcanizing agent, an accelerator of vulcanization, and a p-amino-azo-aromatic hydrocarbon containing at least one condensed ring nucleus.

8. A rubber product resulting from the vulcanization of a rubber composition comprising a vulcanizing agent, an accelerator of vulcanization, and p-amino-azo-naphthalene.

9. The method of preserving rubber which comprises treating rubber with a substance of the following formula $$R_1 - NN - R_2$$

where $R_1$ is an aryl group and $R_2$ is an amino substituted aryl group containing at least 7 carbon atoms.

10. The method of preserving rubber which comprises treating rubber with a substance of the following formula $$R_1 - NN - R_2 - NH_2$$

where $R_1$ and $R_2$ are aromatic hydrocarbon groups, one of which contains a benzene ring and the other a naphthalene ring.

11. The method of preserving rubber which comprises treating rubber with dimethyl-amino azo benzene.

12. A rubber composition comprising rubber and a substance of the following formula $$R_1 - NN - R_2$$

where $R_1$ is an aryl group and $R_2$ is an amino substituted aryl group containing at least 7 carbon atoms.

13. A rubber composition comprising rubber and a substance of the following formula $$R_1 - NN - R_2 - NH_2$$

where $R_1$ and $R_2$ are aromatic hydrocarbon groups, one of which contains a benzene ring and the other a naphthalene ring.

14. A rubber composition comprising rubber and dimethylamino azo benzene.

PAUL C. JONES.